(12) United States Patent
Tuerke et al.

(10) Patent No.: US 6,836,886 B2
(45) Date of Patent: Dec. 28, 2004

(54) METHOD AND APPARATUS FOR DELIVERING ELECTRONIC INFORMATION

(75) Inventors: Thomas Mike Tuerke, Novato, CA (US); Priya Rawat, Richmond, CA (US); Janice Pei-I Huang, San Jose, CA (US)

(73) Assignee: Autodesk, Inc., San Rafael, CA (US)

( * ) Notice: Subject to any disclaimer, the term of this patent is extended or adjusted under 35 U.S.C. 154(b) by 647 days.

(21) Appl. No.: 09/813,095

(22) Filed: Mar. 19, 2001

(65) Prior Publication Data

US 2004/0015954 A1 Jan. 22, 2004

(51) Int. Cl.[7] .............................................. G06F 9/445
(52) U.S. Cl. ...................... 717/178; 717/105; 717/115; 707/4; 707/10; 707/100; 707/513; 707/501.1
(58) Field of Search ................................ 717/168–178, 717/105, 107, 109, 113; 709/217, 227; 707/4, 10, 100, 513, 501.1

(56) References Cited

U.S. PATENT DOCUMENTS

| | | | | |
|---|---|---|---|---|
| 5,832,505 | A | * 11/1998 | Kasso et al. | ............. 707/104.1 |
| 6,292,185 | B1 | * 9/2001 | Ko et al. | .................... 345/763 |
| 6,313,835 | B1 | * 11/2001 | Gever et al. | ................ 345/846 |
| 6,594,664 | B1 | * 7/2003 | Estrada et al. | ................ 707/10 |
| 6,636,863 | B1 | * 10/2003 | Friesen | ....................... 707/102 |

OTHER PUBLICATIONS

Microsoft Corp., Web Workshop, "res Protocol," ©2001, 1 pg.
Wrox Press, "Using the res Protocol," 1997, 1 pg.
The Code Project, "How to use the res: Protocol in Developer Studio," Mar. 26, 2000, 2 pgs.
Microsoft Corp., "How to Write and Use ActiveX Controls for Microsoft Windows CE," Jun. 1999, 7 pgs.
Microsoft Corp., Web Workshop, "write Method," #2001, 1 pg.
TechWeb, Tech Encyclopedia, "OCX," 1998, 2 pgs.
TechWeb, Tech Encyclopedia, "ActiveX Control," #1998, 3 pgs.
Client Side Programming, May 11, 2000, 12 pgs.
E.R. Harold, "XML: Extensible Markup Language," Chapter 2, Beginning XML,#1998, 5 pgs.
Microsoft Corp., Web Workshop, "ActiveX Magic: An ActiveX Control and DCOM Sample Using ATL," Overview, Part 2–4, May 1997, 26 pgs.
Microsoft Corp., MicrosoftCOM Technologies, "ActiveX Controls," Mar. 30, 1999, 1 pg.
TechWeb, Tech Encyclopedia, "OLE," 1998, 4 pgs.
TechWeb, Tech Encyclopedia, "Object Packager," Jun. 30, 2000, 1 pg.
TechWeb, Tech Encyclopedia, "COM automation," 1998, 2 pgs.
TechWeb, Tech Encyclopedia, "ActiveX Documents," Jun. 30, 2000, 1 pg.

* cited by examiner

Primary Examiner—Antony Nguyen-Ba
Assistant Examiner—Chuck Kendall
(74) Attorney, Agent, or Firm—Gates & Cooper LLP

(57) ABSTRACT

A method, apparatus, system, and article of manufacture for electronically obtaining a Web page in a Web browser. A Web page is requested. In response, the browser receives a bootstrap file that comprises a declaration of a component module control object, and a script block comprising a method that accesses the component module control object. The object identified in the declaration is obtained. The object also includes one or more resources. The object is then installed in the Web browser. The Web browser may then use the method of the script block to extract a Web page based on the resources of the component module control object. The Web browser may also be configured to determine if the control object is an up to date version. If the control object is not an up to date version, the browser obtains and installs an up to date version.

27 Claims, 2 Drawing Sheets

METHOD AND APPARATUS FOR DELIVERING ELECTRONIC INFORMATION

BACKGROUND OF THE INVENTION

1. Field of the Invention

The present invention relates generally to delivering information from a server to a client, and in particular, to a method, apparatus, and article of manufacture for delivering Web content to a client.

2. Description of the Related Art

Content and information such as images and hypertext markup language (HTML) documents are delivered from a server across the Internet and the World Wide Web where the information is utilized and displayed by a client. The content and information may be prohibitively large to deliver across a limited bandwidth Internet connection. For example, several thousand bytes of server-fed documents (and images) may be transmitted to a client using a 33 kbps dial-up connection. Additionally, some features of a Web site may not be available until all of the content and information for a Web site has been received at the client. Accordingly, a degradation in performance may result with an increase in the amount of content on a Web site.

Servers may configure a Web site such that some content and information is available while the user is offline and other content and information may be available while a user is online. Accordingly, developers are forced to maintain two sets of content and information (e.g., two sets of HTML files). One set reflects the site's capabilities while the user is offline and is installed on a client's/user's machine. The other set reflects the site's capabilities while the user maintains an Internet connection (or connection to a specific server) and resides on the server. Maintaining two sets of data leads to the possibility of dissimilar experience while a user is offline verses online. Such a dissimilar experience may result even though some aspects of offline functionality may be present while online.

A high degree of overlap exists between the content and information that is available offline with the content and information available online. Additionally, the attendant maintenance issues with the different information exist. Thus, whenever a defect is identified in a common area of code, care must be taken to ensure that the defect is repaired in both locations.

Further, trade secrets, patentable subject matter, copyrighted material, and other intellectual property may be present within the source code of a Web page/site. Such source code is readily viewable by even the least sophisticated user. A mechanism is not available to prevent the viewing of such intellectual property while maintaining the full viewing and processing capabilities of a Web site regardless of whether the user is online or offline.

SUMMARY OF THE INVENTION

A method, apparatus, system, and article of manufacture for displaying Web pages on a Web browser is provided in accordance with one or more embodiments of the invention. A Web browser is augmented with a download object (also referred to as a component module control object) that has resources bound to it and an interface that (scripts running on) the Web browser can call. For example, the download object may comprise an ActiveX™ control or an object written in the Java™ programming language. The resources comprise all of the components necessary for a Web page.

Embodiments of the invention may operate in either an online or offline/local mode. In local mode, the components and resources of a download object exclusively comprise the contents of the Web page. Thus, since all of the components necessary for the Web page are encompassed within the download object, the Web browser can load the download object and Web page even while the user is offline. While in online mode, contents and resources stored on the server may be combined with the local content to create a Web page.

Additionally, the Web browser can detect when the server has a newer version of the download object. When the server has a newer version, the Web browser downloads and updates the client's version with a minimum of user intervention. The intellectual property is bound up inside of the download object, and only a single method is exposed to a Web browser. Accordingly, only the most sophisticated users will be able to access

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

A Web browser may be augmented with a download object that may have resources bound to it. Thus, the download object carries along all of the components necessary for a Web page. The Web browser can detect when the server has a newer version of the download object. When the server has a newer version, the Web browser downloads and updates the client's version with a minimum of user intervention. Further, since all of the components necessary for the Web page are encompassed within the download object, the Web browser can load the download object and Web page even while the user is offline. Additionally, since the intellectual property is bound up inside of the download object, only the most sophisticated users will be able to access it.

Hardware and Software Environment

Figure 1:
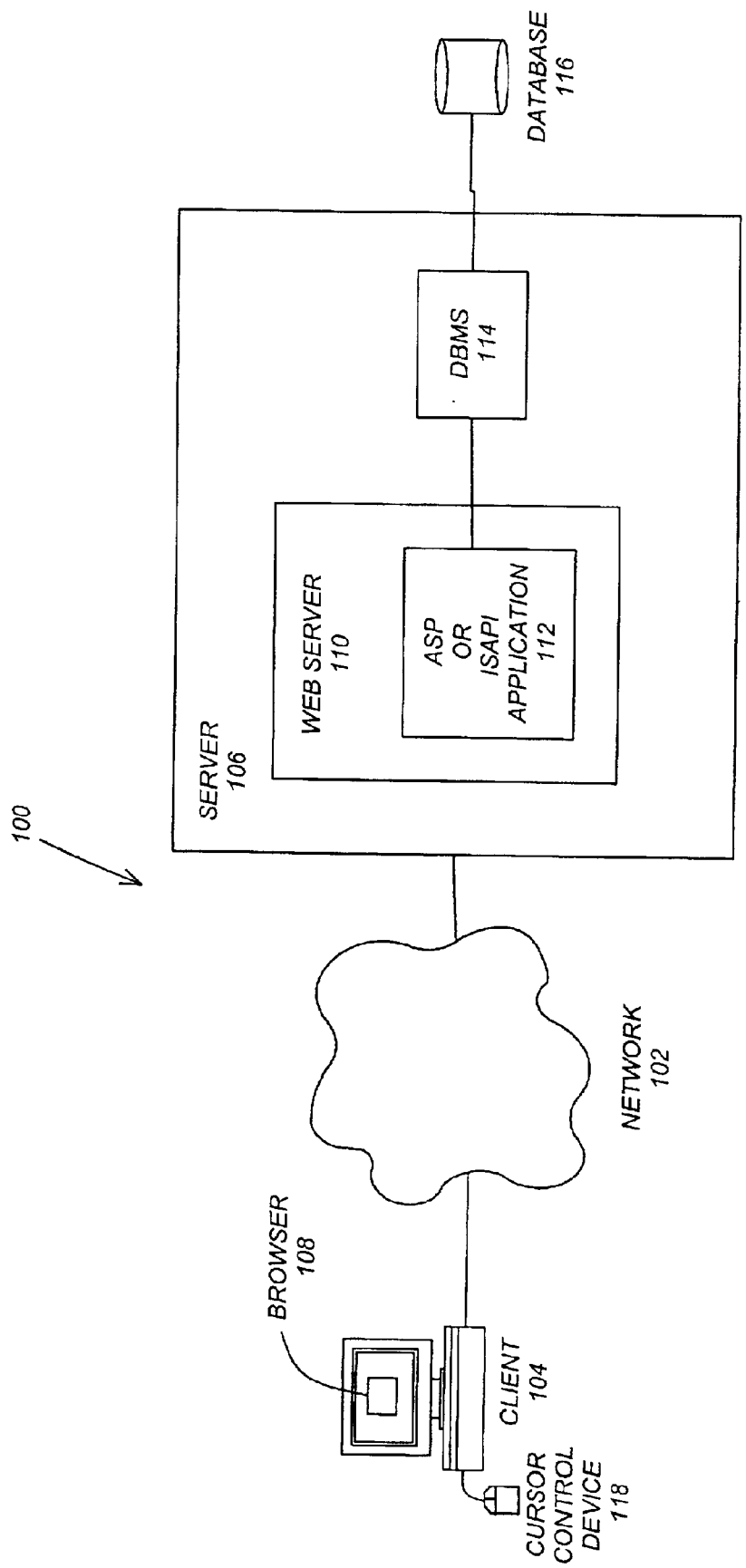
FIG. 1 schematically illustrates a hardware and software environment in accordance with one or more embodiments of the invention.

FIG. 1 schematically illustrates a hardware and software environment in accordance with one or more embodiments of the invention, and more particularly, illustrates a typical distributed computer system 100 using a network 102 to connect client computers 104 to server computers 106. A typical combination of resources may include a network 102 comprising the Internet, LANs, WANs, SNA networks, or the like, clients 104 that are personal computers or workstations, and servers 106 that are personal computers, workstations, minicomputers, or mainframes. Additionally, both client 104 and server 106 may receive input (e.g., cursor location input) and display a cursor in response to an input device such as cursor control device 118.

A network 102 such as the Internet connects clients 104 to server computers 106. Clients 104 may execute a client application or Web browser 108 and communicate with server computers 106 executing Web servers 110. Such a Web browser 108 is typically a program such as NETSCAPE NAVIGATOR or MICROSOFT INTERNET EXPLORER.

Further, the software executing on clients 104 may include a script (e.g., a script written in JavaScript or VBScript) or be downloaded from server computer 106 to client computers 104 and installed as or augmented with a plug in or download object of a Web browser. Accordingly, clients 104 may utilize ActiveX components/component object model (COM) or distributed COM (COM) components to provide a sophisticated user interface on a display of client 104.

Download objects such as ActiveX controls may also be referred to as OCX (OLE™ control extension) controls or component module control objects. ActiveX/OCX is a component software technology that enables a program to add functionality by calling ready-made components. Download objects appear to the end user as just another part of the program. Further, download objects may be transported from the server 106 to the client 104 allowing dynamic updating of the controls.

A download object may be viewed as a dynamic link library (DLL) that announces itself to a system in such a way as to allow a scripting engine (e.g., a Web browser 108) to make calls into it. DLLs can have resources bound to them. In particular, such resources may include textual content (e.g., HTML files or XML (extensible markup language) files), images (e.g., GIF (graphics interchange format) or JPEG (joint photographic experts group) images), or content/information in any other media (e.g., sound clip, video, etc.).

The Web server 110 is typically a program such as Microsoft's Internet Information Server. Web server 110 may host an Active Server Page (ASP) or Internet Server Application Programming Interface (ISAPI) application 112, which may be executing scripts. The scripts invoke objects that execute business logic (referred to as business objects). The business objects then manipulate data in database 116 through a database management system DBMS) 114. Alternatively, database 116 may be part of or connected directly to client 104 instead of communicating/obtaining the information from database 116 across network 102. When a developer encapsulates the business functionality into objects, the system may be referred to as a component object model (COM) system. Accordingly, the scripts executing on web server 110 (and/or application 112) invoke COM objects that implement the business logic. Further, server 106 may utilize Microsoft's Transaction Server (MTS™) to access required data stored in database 116 via an interface such as ADO™ (Active Data Objects), OLE DB (Object Linking and Embedding DataBase), or ODBC™ (Open DataBase Connectivity).

Generally, these components 108–118 all comprise logic and/or data that is embodied in or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Thus, embodiments of the invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby.

Detailed Software Embodiments

As described above, a Web browser 108 may be augmented with a download object that may include (or be bound to) resources that comprise all of the components necessary for a Web page. The Web browser 108 can detect when the server 106 has a newer version of the download object. When the server 106 has a newer version, the Web browser 108 downloads and updates the client's 104 version of the control with the newer version from the server 106 with a minimum of user intervention.

To use the download object and create a Web page using the control's components/resources, the control is provided with a single method that may be invoked using a script tag. The method accesses the various components in the download object and returns a Web page. While offline, all of the features and content encompassed within the component's resources are available. While online, all of the features and content encompassed within the component's resources are also available in addition to any online content stored on the server 106.

As a download object, only a single method may be exposed to the Web browser 108. Further, when the Web browser 108 opens a document containing the method, the Web browser may only see the document created by the method. Thus, if the "view source" option is elected in the Web browser 108, the bootstrap file is displayed and not the full-blown file. The method may be given a document name, may utilize a parameter string, and returns a Web page created from one or more of the included components/resources and/or online content. The calling script is able to parse the returned textual document in order to achieve a desired goal.

The method searches through the list of the accompanying components and resources (referred to as payload) in the download object, for the document name requested. Once the document is located, the method may merely return the document to the caller as a single string. However, further processing, as discussed in detail below, may occur if the payload document contains other subdocuments.

To initiate the above identified processing, the client 104 requests a Web page from the server 106. In response the server delivers a "bootstrap file" that contains document that references the download object. The bootstrap file is typically only a few hundred bytes long and is easily installed on a client 104 machine (e.g., by Web browser 108) or quickly downloaded across even a slow network 102 connection.

The bootstrap file includes two elements: the download object declaration, and a script block that accesses that object. Table 1 illustrates an example of a bootstrap file:

TABLE 1

```
<HTML>
    <HEAD>
        <TITLE> </TITLE>
            <object classid=clsid:C6637286-300D-11D4-AE0A-0010830243BD
                codebase="http://my.site.com/instres.ocx#version=1,0,0,4"
                id=Instant width=0 height=0 VIEWASTEXT>
            </object>
            <script>
               document.write (Instant.JustAddWater ( "Actoday.htm", 0))
            </script>
    </HEAD>
    <BODY>
    </BODY>
</HTML>
```

In Table 1, an object is created and given the name "Instant". As seen in Table 1, the object is created in a declaration statement that includes an identifier (i.e., clsid:C6637286-300D-11D4-AE0A-0010830243BD), a codebase/location (i.e., "http://my.site.com/instres.ocx#version=1,0,0,4"), and a name (i.e., "Instant"). The codebase location may also specify a version number for the object (e.g., #version=1,0,0,4).

The Web browser 108 parses the object declaration and by referencing the identifier can determine if the object has been installed yet. If the object has not been installed or has not been downloaded to the browser 108, the browser 108 may use the codebase/location to determine the location of the object. Thereafter, the browser 108 may retrieve/download and install the object. Further, if the browser 108 finds the object but determines that it's out of date (i.e., older than the version represented), the browser 108 may attempt to download and install the newest version.

Once the appropriate version of the object is created and installed, the script accesses the object. Such accessing may include invoking the object to extract a document. For example, in Table 1, the "write" method (i.e., document.write) of the document object is utilized for this access/extraction. The write method writes one or more HTML expressions to a document in the specified window. The parameters of the document.write operation include a string that specifies the text and HTML tags to write. In Table 1, the document.write method is used to write the text and HTML tags specified by "Instant. JustAddWater ("Actoday.htm",0)". Thus, the JustAddWater method of the Instant download object is called.

The JustAddWater method may comprise an extraction utility that extracts the specified document (e.g., "Actoday.htm") in either an online or offline mode. In an offline mode, the specified document is entirely comprised with local content stored in the payload. In an online mode, the specified document may contain content located in both the payload and stored on a server. The JustAddWater method fetches a payload document, and searches it for references to external style sheets and scripts. Each of the references may be in turn fetched from the payload area (or online if in online mode) and inserted in lieu of the external references.

Accordingly, the original bootstrap document is used to load and execute an object that creates a Web page based on components delivered with the object. As described, the result of the HTML specified in Table 1 is a string (presumably HTML) that is written over the bootstrap document, effectively replacing it.

While offline (i.e., in offline/local mode), the user may have access to all of the features and contents contained within the payload. Accordingly, in local mode, local bootstrap files load an appropriate object and request a specific document from within the object. While online (i.e., in online mode), in addition to access to all of the features and contents in the payload, the user may have access to online features and content on the server. The object may enable access to such online features once a user establishes a connection to the Internet or the server 106. Accordingly, the object may provide the user with different features and content depending on whether the user is online or offline. Further, if online content is used, it is likely combined with offline content thereby reducing the number and time needed for transmissions with the server 106.

By using a bootstrap document and an object as described, a file only a few hundred bytes long can evoke a very sophisticated Web page presentation very quickly, regardless of the connection type. Further, a noticeable delay may only arise when the Web browser 108 determines that a new version of the object must be downloaded.

As briefly described above, processing beyond merely returning a located payload document may occur when the payload document refers to one or several other subordinate documents or external references (in addition to any hyperlinks to completely separate documents). For example, a document may refer to other subordinate documents such as JavaScript™ files, VBScript™ files, or external cascading style sheets (CSS). Thus, further processing may occur when an HTML document refers to a cascading style sheet (CSS) or to an external script file.

Such further processing may alter or rewrite a payload document with subordinate documents to produce a single string document that contains all of the subordinate documents inline, for example. In-line means may be available and leveraged for expressing one or more such subordinate documents. For example, Table 2 illustrates the HTML of a document retrieved from a download object's payload.

TABLE 2

```
<html>
    <head>
        <link rel="stylesheet" href="mystyle.css">
    </head>
    <script src="myscript.js"> </script>
    <script src="myscript.vbs" language="vbscript"> </script>
    <body>
        This is my page
    </body>
</html>
```

The above HTML includes a link to CSS named "mystyle" and a script named "mysctipt.js" which are included as components in the download object. The download object method may rewrite the HTML of Table 2 as indicated in Table 3.

TABLE 3

```
<html>
    <head>
        <style>
        // the contents of mystyle.css here; e.g.:
            body {background-color: green; color: gold;}
            B {font-size: 20;}
        </style>
    </head>
    </script>
    // the contents of myscript.js here; e.g.:
        alert("Hello from 'myscript.js' ")
    </script>
    <script>
    // the contents of myscript.vbs here; e.g.:
        MsgBox("Hello from 'myscript.vbs' ")
    </script>
    <body>
    This is my page
    <body>
</html>
```

As illustrated in Table 3, the <link> tag was replaced by an inline <style> block, and the individual <script src=> tags were replaced by inline <script> blocks. By converting the HTML as indicated and providing the entire page as a single string, the need for the download object to write to the user's disk is completely eliminated. By rewriting a document as a single string, many advantages may be provided. For example, code-reuse may be facilitated, the size of the download object may be reduced, maintainability of the code may be improved, and/or developers may be provided with reasonable flexibility in designing a Web page.

Thus, as described above, strings of the form

<link rel="stylesheet"href="document.name"> may be systematically replaced with the actual document surrounded by <style> and </style> tags. Further, strings of the form <script . . . src="document.name" . . . ></script> may be replaced with the actual document surrounded by <script . . . . . . > and </script> tags, where all parameters except src= may be carried forward into the new <script> tag.

Since a mechanism for folding images or other media into a document (similar to the mechanism for including style sheets or script files into a document as described above) may not be available, images may remain "external". To address external images or media, the Web browser 108 may utilize a resource or "RES" protocol. The RES protocol provides a mechanism for accessing HTML pages embedded as a resource in a DLL (dynamic link library) file or Win32 executable module. Accordingly, using the RES protocol, an image included in the payload may be accessed and extracted for display by the Web browser 108.

The following example illustrates a method (using the RES protocol) for writing images and/or other media, enables the compliance with filename restrictions, and maintains expected behavior of a Web browser 108:

```
<script>
    // some common functions
    function dw(x) {document.write(x) }
    function IR(x) {return "res://InstFred.ocx/IMG/"+x}
</script>
``` then

<script>dw("<img src='"+IR("myimage.gif")+"'>")</script>

The above example illustrates the use of a script to execute various functions and allows the stubbing of IR to return only x (to aid in debugging).

Figure 2:
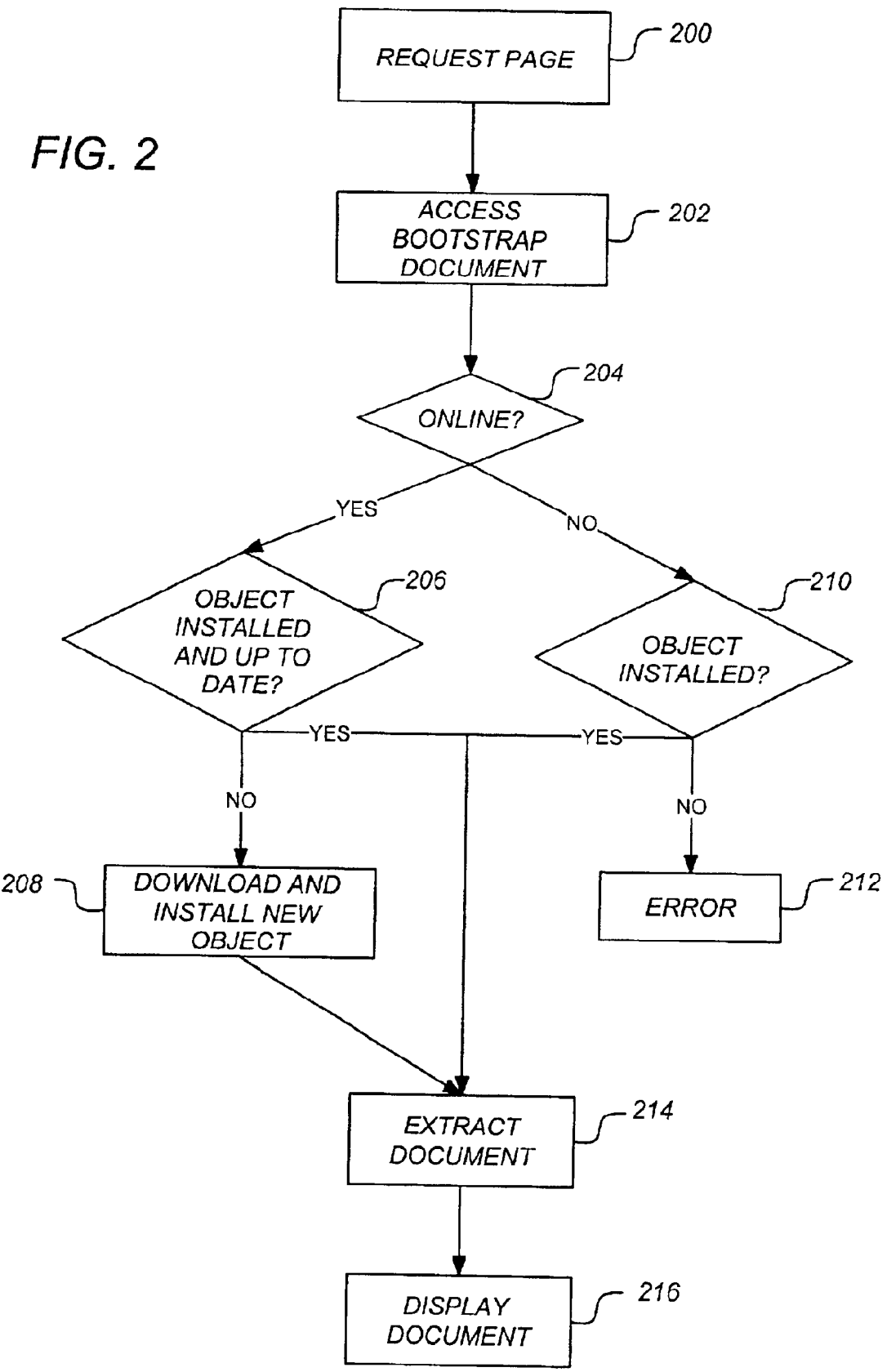
FIG. 2 is a flow chart illustrating the retrieval, processing, and display of a Web page in accordance with one or more embodiments of the invention.

FIG. 2 is a flow chart illustrating the retrieval, processing, and display of a Web page in accordance with one or more embodiments of the invention. At step 200, a Web page is requested. Such a request may arise from user input into a Web browser, for example. Alternatively, the Web page may be requested from a server 106 by a Web browser 108 on a client 104. The Web browser 108 accesses the bootstrap document at step 202. If the client 104 is connected across a network 102 to the server 106 (i.e., the user is online), the bootstrap document is transmitted from server 106 to client 104. However, if the user is offline, client 102 may use a previous version of the bootstrap document.

At step 204, a determination is made regarding whether the client 104 is online or offline. If the client 104 is online, a determination is made at step 206 regarding whether the object identified in the bootstrap file is installed and up to date. If the object is not installed and up to date, the new object identified in the bootstrap file is downloaded at step 208. However, if it is determined that client 104 is not online at step 204, a determination is made at step 210 as to whether an object is installed. If an object is not installed, an error condition results at step 212.

Once it is determined that an acceptable object is installed (i.e., when the user is offline and an object is installed or when the client 104 is online and an up to date object is installed), the bootstrap script is used to extract the document at step 214 (e.g., from the payload exclusively in offline mode, or potentially from the payload and server if in online mode). Once extracted, the Web browser 108 displays the extracted document at step 216. Such an extracted document may include online features and content if the user remains online or may only include offline features and content if the user has disconnected. Accordingly, if the client 104 is offline, the Web page may be obtained exclusively via the locally stored bootstrap file (e.g., from cache or a locally-installed file).

In an example of an embodiment of the invention, a product consists of local and server-provided content that need to be presented on the same HTML-based page. A user installs the product (i.e., a download object) registering it with the user's computer system. The user starts the product and is presented with an offline screen that constitutes a clearinghouse for features available while offline, plus a means of connection to a server. The user may use offline features that are part of the product's locally stored payload. When the user connects to the server, the server feeds a bootstrap document to the client. The object declaration of the bootstrap document indicates that the control/object is still the latest version of the product. Accordingly, a new object is not downloaded or installed.

Continuing with the example, the bootstrap document extracts the online version of the page (which may have been shipped with the product, but never accessed until now) and presents the page to the user (i.e., steps 214 and 216 of FIG. 2). Online features, some offline features, and a means of disconnecting from the server may be provided through the object. When the user uses the offline features, the system may respond quickly since the source is drawn from the object's payload. When online features ate accessed by a user, traditional client-server round-trip transmissions take place. Further, local content may continue to be available, with local-mode performance. The user may then disconnect from the server.

When the user starts up the product at another time, the object remembers that it was previously online and restores the connection to the server. The object may then wait for the server-based bootstrap file to be sent to the client. However, local content is immediately available, so the user is not waiting for the server. If the bootstrap file indicates that a newer version of the object is available, the browser begins transferring the new version and replaces the older version. Once the new version of the object is downloaded and installed, the local content (located in the payload of the new version) may be used immediately while any additional online feature content is transmitted from the server. Once the user disconnects from the server again, the offline features and content from the newer version remain available. Accordingly, the object provides the user with content while offline and online.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, embodiments of the invention provide for the use of an object (containing resources and components) that is deployed on a client. The object may be used to extract and create a Web page using the locally stored resources and components. Accordingly, local mode behavior can emulate online behavior. Additionally, there is improved performance while online and local mode behavior can be revised at any time. For example, whenever the client connects to the server (e.g., by visiting a Web site), the object may be updated, and consequently, the content may be updated. By providing the code encompassed within an object, the source code for the object is obscured, thereby reducing the likelihood of tampering. Further, using the object, a single code repository exists for both offline (local mode) and online modes.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A computer-implemented method for electronically obtaining a Web page in a Web browser comprising:
   requesting a Web page;
   obtaining a bootstrap file, wherein the bootstrap file comprises
      a declaration of a component module control object; and
      a script block comprising a method that accesses the component module control object;
   obtaining the component module control object, wherein the component module control object comprises one or more resources;
   installing the component module control object; and
   using the method of the script block to extract a Web page based on the resources of the component module control object.

2. The method of claim 1 further comprising:
   determining if the control object is an up to date version of the control object;
   if the control object is not an up to date version, obtaining and installing an up to date version of the control object.

3. The method of claim 2 wherein the determining comprises:
   obtaining a new bootstrap file;
   examining an object declaration of the new bootstrap file to obtain version information; and
   determining if the obtained object version information is more recent than version information for an already installed object.

4. The method of claim 1 wherein:
   a connection to a server is not available; and
   the Web page is obtained exclusively via the bootstrap file, wherein the bootstrap file is stored locally.

5. The method of claim 1 wherein:
   a connection to a server is available; and
   the Web page comprises content obtained from the resources of the component module control object and from the server.

6. The method of claim 1 wherein at least one of the resources is accessed using the RES protocol.

7. The method of claim 1 wherein the object is an ActiveX control.

8. The method of claim 1 wherein the bootstrap file is a text document.

9. A system for electronically obtaining a Web page in a Web browser comprising:
   a bootstrap file, wherein the bootstrap file comprises:
      a declaration of a component module control object; and
      a script block comprising a method that accesses the component module control object;
   a Web browser application executing on a client computer, the Web browser configured to:
      request a Web page;
      obtain the bootstrap file in response to the request;
      obtain the component module control object identified in the bootstrap file, wherein the component module control object comprises one or more resources;
      install the component module control object; and
      use the method of the script block to extract a Web page based on the resources of the component module control object.

10. The system of claim 9, the Web browser further configured to:
    determine if the control object is an up to date version of the control object;
    if the control object is not an up to date version, obtain and install an up to date version of the control object.

11. The system of claim 10 wherein the Web browser determines if the control object is up to date by:
    obtaining a new bootstrap file;
    examining an object declaration of the new bootstrap file to obtain version information; and determining if the obtained object version information is more recent than version information for an already installed object.

12. The system of claim 9 wherein:

a connection to a server is not available; and the Web page is obtained exclusively via the bootstrap file wherein the bootstrap file is stored locally.

13. The system of claim 9 wherein:

a connection to a server is available; and the Web page comprises content obtained from the resources of the component module control object and from the server.

14. The system of claim 9 wherein at least one of the resources is accessed using the RES protocol.

15. The system of claim 9 wherein the object is an ActiveX control.

16. The system of claim 9 wherein the bootstrap file is a text document.

17. An article of manufacture embodying logic for performing a method of electronically obtaining a Web page in a Web browser, the method comprising:

requesting a Web page;

obtaining a bootstrap file, wherein the bootstrap file comprises
- a declaration of a component module control object; and
- a script block comprising a method that accesses the component module control object;

obtaining the component module control object, wherein the component module control object comprises one or more resources;

installing the component module control object; and using the method of the script block to extract a Web page based on the resources of the component module control object.

18. The article of manufacture of claim 17, the method further comprising:

determining if the control object is an up to date version of the control object;

if the control object is not an up to date version, obtaining and installing an up to date version of the control object.

19. The article of manufacture of claim 18 wherein the determining comprises:

obtaining a new bootstrap file;

examining an object declaration of the new bootstrap file to obtain version information; and determining if the obtained object version information is more recent than version information for an already installed object.

20. The article of manufacture of claim 17 wherein:

a connection to a server is not available; and the Web page is obtained exclusively from the resources of the component module control object.

21. The article of manufacture of claim 17 wherein:

a connection to a server is available; and the Web page comprises content obtained via the bootstrap file, wherein the bootstrap file is stored locally.

22. The article of manufacture of claim 17 wherein at least one of the resources is accessed using the RES protocol.

23. The article of manufacture of claim 17 wherein the object is an ActiveX control.

24. The article of manufacture of claim 17 wherein the bootstrap file is a text document.

25. A computer-implemented method for electronically delivering a Web page comprising:

(a) receiving a request for a Web page;

(b) transmitting a bootstrap file to a client, wherein the bootstrap file comprises:
   (1) a declaration of a component module control object; and
   (2) a script block comprising a method that accesses the component module control object;

(c) transmitting the component module control object to the client, wherein the component module control object:
   (1) comprises one or more resources; and
   (2) is used by the method of the script block to extract a Web page based on the resources of the component module control object.

26. A system for electronically delivering a Web page comprising:

(a) a bootstrap file, wherein the bootstrap file comprises:
   (1) a declaration of a component module control object; and
   (2) a script block comprising a method that accesses the component module control object;

(b) an application executing on a server computer, the application configured to:
   (1) receive a request for a Web page;
   (2) transmit the bootstrap file in response to the request; and
   (3) transmit the component module control object identified in the bootstrap file, wherein the component module control object:
      (i) comprises one or more resources; and
      (ii) is used by the method of the script block to extract a Web page that is based on the resources of the component module control object.

27. An article of manufacture embodying logic for performing a method of electronically delivering a Web page, the method comprising:

(a) receiving a request for a Web page;

(b) transmitting a bootstrap file, wherein the bootstrap file comprises
   (1) a declaration of a component module control object; and
   (2) a script block comprising a method that accesses the component module control object;

(c) transmitting the component module control object, wherein the component module control object:
   (1) comprises one or more resources; and
   (2) is used by the method of the script block to extract a Web page based on the resources of the component module control object.

* * * * *